United States Patent Office 3,317,329
Patented May 2, 1967

3,317,329
1,3-DIOXOLANE AND 3-OXETANONE SOLUTIONS OF CYANOETHYLATED CARBOHYDRATES
Harry D. Williams, Penns Grove, N.J., assignor to E. I. du Pont de Nemours and Company, Wilmington, Del., a corporation of Delaware
No Drawing. Filed Dec. 29, 1964, Ser. No. 422,021
8 Claims. (Cl. 106—176)

ABSTRACT OF THE DISCLOSURE

Solutions of cyanoethylcellulose, cyanoethylstarch, cyanoethylamylose, cyanoethylamylopectin having a degree of substitution greater than about 2.2 or octacyanoethylsucrose in 1,3-dioxolane, 3-oxetanone and mixtures thereof. These solutions can be cast into films with or without additives.

The present invention relates to new solutions of certain highly cyanoethylated carbohydrate ethers and more particularly, to solutions of cyanoethylcellulose, cyanoethylstarch, cyanoethylamylose, cyanoethylamylopectin and cyanoethylsucrose and methods of forming films therefrom.

Acrylonitrile has been reacted with hydroxyl-containing carbohydrate materials to prepare organic-soluble cyanoethyl ethers useful as film formers having good electrical properties. Such carbohydrate materials include, among others, cellulose, starch, the starch fractions amylose and amylopectin, and sucrose. These carbohydrate ethers form films that are known to be particularly valuable as film-forming agents. For example, cyanoethylcellulose and cyanoethylstarch (including cyanoethylated starch fractions such as amylose and amylopectin) having from about 2.2 to 3 of their available hydroxyl hydrogens substituted with cyanoethyl groups, i.e., a degree of substitution (D.S.) of 2.2 to 3, as well as octacyanoethyl sucrose, are particularly useful in electrical applications for making films having a high dielectric constant and low dissipation factor. These films of carbohydrate ethers are also useful as binders for phosphors in electroluminescent panels. However, in order to use these carbohydrate materials as binders or in film form they must first be in solution in suitable solvents. Solvents such as dimethylformamide, acetonitrile, acetone, pyridine and mixtures of the above have been used to dissolve the aforementioned carbohydrate ethers. However, these solvents all have certain disadvantages. For example, most of these solvents give carbohydrate solutions having very high viscosities particularly when cyanoethylcellulose is treated at workable concentration levels, i.e. 5–20% solids. Other solvents, such as dimethylformamide, are not particularly suitable because they are very high boiling and are difficult to remove from the films and it is difficult to recover the solvent for reuse.

Mixed solvents such as dimethylformamide-acetone (50–50), dioxane-water (90–10) and others have been used to form solutions of cyanoethylated carbohydrate materials, but without much success. For example, it is very difficult to obtain clear films from solutions of cyanoethylcellulose in mixed solvents. To obtain clear films all the solvents in the mixture must have substantially the same evaporation rate, or each component of the mixture must be equally effective as a solvent for cyanoethylcellulose, in which case very litle reason would exist to use a mixed solvent.

It is an object of this invention to provide solutions of certain carbohydrate ethers. Another object of this invention is to provide low viscosity solutions of certain cyanoethylated carbohydrate ethers. A further object of this invention is to provide clear solutions of cyanoethylated carbohydrate ethers. Still another object of this invention is to provide films of cyanoethylated carbohydrate ethers from which the solvents are easily removed. These and other objects of the invention will become apparent from the following detailed description.

It has been found that solutions of cyanoethylcellulose, cyanoethylstarch, cyanoethylamylose, cyanoethylamylopectin having a degree of substitution of at least about 2.2 to 3 cyanoethyl groups per anhydroglucose unit and cyanoethylsucrose can be prepared when said ethers are dissolved in 1,3-dioxolane or 3-oxetanone or mixtures thereof. Furthermore, the present invention also provides a process for making films from said cyanoethylated carbohydrate solutions which comprises casting the solution onto a suitable surface in film form and subsequently evaporating substantially all of the solvent from the film.

The amount of solvent necessary to dissolve the cyanoethylated carbohydrate material varies and it depends on, among other things, the particular carbohydrate material being treated, the degree of polymerization and degree of substitution of the ether. The weight of solvent needed to form a solution can be easily ascertained by routine experimentation, however, generally at least about 4 times the weight of carbohydrate derivative, and usually not more than 50 times. As pointed out above, the weight of solvent required to dissolve the carbohydrate material depends primarily on the material being treated, for example, for cyanoethylated cellulose the range is from about 4 to 50 times the weight of the carbohydrate materials for cyanoethylatedstarch the range is from about 2 to 50, for cyanoethylated amylose 2 to 50, and cyanoethylated amylopectin 2 to 50. Octacyanoethylsucrose is miscible in all proportions with 1,3-dioxolane, 3-oxetanone, or mixtures thereof.

1,3-dioxolane or glycol formal, gives solutions of cyanoethylcellulose, having a D.S. about from 2.2 to 2.6, which are unexpectedly superior in clarity and much lower in viscosity than those in any other previously disclosed solvent. As the D.S. of the cyanoethylcellulose increases above 2.6 up to 3, 1,3-dioxolane is still effective as a solvent, but the results are better at lower D.S. levels, e.g., between 2.2 to 2.6. Furthermore, 1,3-dioxolane boils at 75–6° C. and is easily evaporated from the solutions and recovered for reuse.

3-oxetanone, on the other hand, gives solutions of cyanoethylcellulose having a D.S. from about 2.2 to substantially complete substitution of the free hydroxyl groups, i.e., 3, which are also superior in clarity to previous known solutions and low in viscosity. 3-oxetanone boils at 106° C. at atmospheric pressure and is easily evaporated from the solution and recovered for reuse.

The excellent solubility of cyanoethylcellulose in 1,3-dioxolane is completely unexpected. p-Dioxane, very close to 1,3-dioxolane in structure, is not a solvent for cyanoethylcellulose at any D.S. level. Likewise, 1,4-butanediolformal, another very closely related compound, is not a solvent for cyanoethylcellulose.

The low viscosity of solutions of cyanoethylcellulose in 3-oxetanone is surprising. Acetone, a known solvent for cyanoethylcellulose, which can be viewed as closely related to 3-oxetanone, gives solutions which are extremely high in viscosity and hazy as disclosed in U.S. Patent 3,097,956 (Saunders et al.).

Cyanoethylcellulose having a D.S. above about 2.2 has particularly effective electrical properties but the adhesion to substrates of films formed from cyanoethylcellulose having a D.S. much above about 2.6 is markedly inferior to those films formed from cyanoethylcellulose having a D.S. about from 2.2 to 2.6. Therefore the uses requiring adhesion to a substrate, cyanoethylcellulose having from about 2.2 to 2.6 D.S. is preferred. Thus, 1,3-dioxolane is an excellent solvent for the grade of cyanoethylcellulose having a D.S. necessary to have optimum adhesive properties.

Solutions of cyanoethylstarch, cyanoethylamylopectin, cyanoethylamylose, and cyanoethylsucrose are not generally high in viscosity in any solvent at concentration levels up to 20% or higher. The solvents of the present invention, and particularly, 3-oxetanone, give solutions of these materials of higher clarity than those in any previously disclosed solvent and said solvents are easy to recover for reuse. Cyanoethylsucrose is a viscous liquid substantially completely substituted with cyanoethyl groups, i.e., from 7–8 cyanoethyl groups per sucrose molecule. Such cyanoethylsucrose is soluble in 3-oxetanone or 1,3-dioxolane in any proportion.

1,3-dioxolane and 3-oxetanone have an additional advantage over low density solvents for cyanoethylated carbohydrate materials such as, for example, acetonitrile or acetone, because solutions of said materials in 1,3-dioxolane or 3-oxetanone contain larger quantities of film-forming agent per unit volume. Solutions containing 10% by weight of cyanoethylcellulose, for example, in 1,3-dioxolane or 3-oxetanone occupy approximately 70% of the volume of an equal weight of solutions of the same concentration in acetonitrile. This smaller volume allows smaller shipping containers at less cost.

The invention is illustrated by the following specific examples wherein parts and percentages are by weight, unless otherwise indicated.

EXAMPLES

Synthesis of 3-oxetanone

To a well-stirred mixture of 350 parts ether, 350 parts water, 0.5 part osmium tetroxide, and 41 parts 3-methylene oxetane, there is added over a 1½ hour period at 0° C., 258 parts of sodium metaperiodate. The stirred mixture is maintained at 0° C. for an additional hour and then allowed to come to room temperature. Stirring is continued for an additional 70 hours.

At the end of this period, the ether layer is decanted and dried over anhydrous magnesium sulfate. The aqueous phase is filtered to remove the precipitated sodium iodate and the filtered salt is washed by decantation with five 100 ml. portions of methylene chloride. The combined methylene chloride washes are added to a continuous extractor and the aqueous filtrate is extracted for 48 hours. The methylene chloride solution is then added to the ether solution and the combined organic phase is dried with anhydrous magnesium sulfate. The ether and methylene chloride are removed by distillation at atmospheric pressure to yield 60 parts of a black solution. The black solution is transferred to a trap and distilled at 0–5° C. (10 mm.) into a trap immersed in a Dry Ice acetone bath. The distillate is redistilled at 58–60° (150 mm.) to yield 16 parts (57%) of a liquid.

The structure of 3-oxetanone is confirmed by infrared spectra ($\lambda$ CCl$_4$ max. 1840 cm.$^{-1}$ (=O and 963 cm.$^{-1}$ oxetane)), NMR spectra (single peak 4.48 $\tau$), elemental analysis calculated for C$_3$H$_4$O$_2$: C, 50.00; H, 5.60. Found: C, 49.86; H, 5.80.

The 2,4-dinitrophenylhydrazone derivative of oxetanone is prepared in the usual manner and recrystallized twice from ethanol to yield yellow needles, M.P. 152–153°.

*Analysis.*—Calcd. for C$_9$H$_8$O$_5$N$_4$: C, 42.86; H, 3.20; N, 22.22. Found: C, 42.67; H, 3.00; N, 21.94.

EXAMPLE 1

Cyanoethylcellulose (5 parts) (D.S. 2.58) is added to 95 parts 1,3-dioxolane and a clear solution is obtained.

EXAMPLE 2

10% solutions of cyanoethylcellulose (D.S. 2.58) in 1,3-dioxolane, acetonitrile, acetone and 3-oxetanone were prepared by adding the ethers to the solvents. The cyanoethylcellulose was made from cellulose having a cupriethylenediamine viscosity of 2.90 centipoises (0.5% solution) as determined by the TAPPI 230 method.

| Solution | Viscosity [1] | Remarks |
|---|---|---|
| Acetone | 45 min | Hazy and grainy. |
| Acetonitrile | 39 min. 22 sec | Grain-free and clear. |
| 1,3-dioxolane | 4.6 sec | Do. |
| 3-oxetanone | 4 sec | No trace of grain, haze or fiber. |

[1] Time necessary for a 3/32-inch steel ball to fall 1 inch through the solution.

From the above it can be seen that the viscosity of the compositions using 1,3-dioxolane or 3-oxetanone are substantially lower than compositions obtained using other solvent.

EXAMPLE 3

Cyanoethylstarch (D.S. 2.60) is made into a 10% solution in 1,3-dioxolane. The solution is almost as thin as water with a slight haze.

The same cyanoethylstarch is made into a 20% solution in 3 oxetanone. Thickening of the solvent is negligible and the solution is clear and grain free.

Similar results are obtained when cyanoethylamylose and amylopectin are substituted for cyanoethylstarch on an equal weight basis.

EXAMPLE 4

Octacyanoethylsucrose, a viscous liquid, is diluted with one-quarter, one-half, three-quarters and its weight of 1,3-dioxolane with clear solutions being formed. Solutions having concentrations of 5%, 10%, 20%, 30% and 40% of cyanoethylsucrose in 1,3-dioxolane also are made. Similar results are obtained with 3-oxetanone.

EXAMPLE 5

5% solutions of several samples of cyanoethylcellulose are prepared with the following results.

| Sample | D.S. | Solvent | Solubility | Remarks |
|---|---|---|---|---|
| 1 | 2.58 | 1,3-dioxolane | Good | Grain-free and clear. |
|   |      | 3-oxetanone | Excellent | Do. |
| 2 | 2.74 | 3-oxetanone | do | Do. |
|   |      | 1,3-dioxolane | Good | Grain-free, some haze. |
| 3 | 2.77 | 3-oxetanone | Excellent | Grain-free and clear. |
|   |      | 1,3-dioxolane | Fair | Grain-free, some haze. |
| 4 | 2.82 | 3-oxetanone | Excellent | Grain-free and clear. |
|   |      | 1,3-dioxolane | Fair | Some grain and haze. |

EXAMPLE 6

Samples of cyanoethylcellulose having a D.S. of 2.2 are dissolved in 1,3-dioxolane and 3-oxetanone to give 20% pourable solutions of good clarity. The starting cellulose for making the cyanoethylcellulose was cellophane scrap having a degree of polymerization of 200.

Similar results are obtained when a 50–50 mixture of 3-oxetanone and 1,3-dioxolane is used as the solvent.

EXAMPLE 7

Cyanoethylcellulose (D.S. 2.58) (2.5 parts) is dissolved in 3-oxetanone (20 parts). 2.25 parts of a green phosphor (RCA green phosphor 33–Z–235A) is added and the mixture stirred until dispersion is complete. The mixture is cast onto the conductive side of a piece of 3″ x 5″ conductive glass plate using a 10 mil doctor blade. The film is then dried in a forced-draft oven at 80–100° C. A silver electrode 1″ in diameter is then applied to the phosphor-binder layer by spraying a silver-toluene dispersion onto the layer. Final drying is accomplished at 80–100° C. in a forced-draft oven.

When 125 volts 60 cycle current is applied to the electrodes the film luminesces.

Similar results are obtained when cyanoethylstarch, cyanoethylamylose and cyanoethylamylopectin are substituted for the cyanoethylcellulose.

EXAMPLE 8

A film is cast from the same sample of cyanoethylcellulose as used in Example 7 by the same method but without the phosphor and substituting 1,3-dioxolane for 3-oxetanone. Capacitance measurements show the film has a dielectric constant of 19 and a dissipation factor of 0.1 at 100 cycles and 23° C. The volume resistivity is $1.4 \times 10^{11}$.

I claim:

1. A solution of at least 5% of a cyanoethylated carbohydrate selected from the group consisting of cyanoethylcellulose, cyanoethylstarch, cyanoethylamylose, cyanoethylamylopectin said carbohydrates having a degree of substitution greater than about 2.2 and octanoethylsucrose, in a solvent selected from the group consisting of 1,3-dioxolane, 3-oxetanone, and mixtures thereof.

2. The composition of claim 1 wherein the cyanoethylated carbohydrate is cyanoethylcellulose and the solvent is 1,3-dioxolane.

3. The composition of claim 2 wherein the cyanoethylcellulose has a degree of substitution between about 2.2 and 2.6.

4. The composition of claim 1 wherein the cyanoethylated carbohydrate is cyanoethylcellulose and the solvent is 3-oxetanone.

5. The composition of claim 1 wherein the cyanoethylated carbohydrate is cyanoethylstarch and the solvent is 1,3-dioxolane.

6. The composition of claim 1 wherein the cyanoethylated carbohydrate is cyanoethylstarch and the solvent is 3-oxetanone.

7. The composition of claim 1 wherein the cyanoethylated carbohydrate is cyanoethylamylose and the solvent is 1,3-dioxolane.

8. The composition of claim 1 wherein the cyanoethylated carbohydrate is cyanoethylamylose and the solvent is 3-oxetanone.

References Cited by the Applicant
UNITED STATES PATENTS
3,097,956   7/1963   Saunders et al.

MORRIS LIEBMAN, Primary Examiner.

J. FROME, Assistant Examiner.

UNITED STATES PATENT OFFICE
CERTIFICATE OF CORRECTION

Patent No. 3,317,329                                May 2, 1967

Harry D. Williams

It is hereby certified that error appears in the above numbered patent requiring correction and that the said Letters Patent should read as corrected below.

Column 5, lines 21 and 22, for "octanoethylsucrose" read -- octacyanoethylsucrose --.

Signed and sealed this 14th day of November 1967.

(SEAL)
Attest:

Edward M. Fletcher, Jr.                              EDWARD J. BRENNER

Attesting Officer                                         Commissioner of Patents